US012060086B2

(12) United States Patent
Urano et al.

(10) Patent No.: US 12,060,086 B2
(45) Date of Patent: Aug. 13, 2024

(54) AUTONOMOUS DRIVING DEVICE, AUTONOMOUS DRIVING METHOD, AND NON-TRANSITORY STORAGE MEDIUM

(71) Applicant: TOYOTA JIDOSHA KABUSHIKI KAISHA, Toyota (JP)

(72) Inventors: Hiromitsu Urano, Numazu (JP); Sho Otaki, Yokohama (JP); Takashi Suzuki, Susono (JP); Toru Takashima, Susono (JP); Hojung Jung, Sunto-gun Shizuoka-ken (JP); Hiromitsu Kobayashi, Nisshin (JP); Satoru Niwa, Sunto-gun Shizuoka-ken (JP); Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 17/703,551

(22) Filed: Mar. 24, 2022

(65) Prior Publication Data
US 2022/0315045 A1 Oct. 6, 2022

(30) Foreign Application Priority Data

Mar. 30, 2021 (JP) .................................. 2021-058269

(51) Int. Cl.
*B60W 60/00* (2020.01)
*B60W 50/00* (2006.01)
*G05D 1/00* (2024.01)

(52) U.S. Cl.
CPC ...... *B60W 60/005* (2020.02); *B60W 50/0097* (2013.01); *G05D 1/0022* (2013.01); *B60W 2556/45* (2020.02)

(58) Field of Classification Search
None
See application file for complete search history.

(56) References Cited

U.S. PATENT DOCUMENTS

| 11,305,654 | B2* | 4/2022 | Yi | B60L 15/2045 |
|---|---|---|---|---|
| 11,535,112 | B2* | 12/2022 | Maass | B60L 53/305 |
| 11,592,821 | B2* | 2/2023 | Brandon | B60H 1/00971 |
| 11,820,288 | B2* | 11/2023 | Kim | B60R 16/033 |
| 2008/0298528 | A1* | 12/2008 | Fukushima | G06F 1/3203 |
| | | | | 375/362 |
| 2011/0227532 | A1 | 9/2011 | Nivva | |
| 2017/0313313 | A1 | 11/2017 | Asakura | |

(Continued)

FOREIGN PATENT DOCUMENTS

| EP | 3514644 A1 | 7/2019 |
|---|---|---|
| JP | 2008-299612 A | 12/2008 |

(Continued)

*Primary Examiner* — James J Lee
*Assistant Examiner* — David Hatch
(74) *Attorney, Agent, or Firm* — Dinsmore & Shohl LLP

(57) ABSTRACT

An autonomous driving device includes a plurality of driving function ECUs having a function to drive a vehicle in place of an occupant, and a driving function switch ECU is configured to individually change operating states of the driving function ECUs according to a route to a destination and remaining power. The driving function ECUs include an autonomous driving ECU configured to autonomously drive the vehicle, and a remote control ECU configured to operate the vehicle according to remote control from outside.

7 Claims, 10 Drawing Sheets

(56) References Cited

U.S. PATENT DOCUMENTS

| | | |
|---|---|---|
| 2020/0086884 A1 | 3/2020 | Wang et al. |
| 2021/0031797 A1 | 2/2021 | Hayashida et al. |
| 2021/0039681 A1 | 2/2021 | Tarao et al. |
| 2022/0072962 A1* | 3/2022 | Maury ................. B60W 10/08 |

FOREIGN PATENT DOCUMENTS

| | | |
|---|---|---|
| JP | 2011-196834 A | 10/2011 |
| JP | 2017-197150 A | 11/2017 |
| JP | 2018-077649 A | 5/2018 |
| JP | 2021-022319 A | 2/2021 |
| JP | 2021-028735 A | 2/2021 |

* cited by examiner

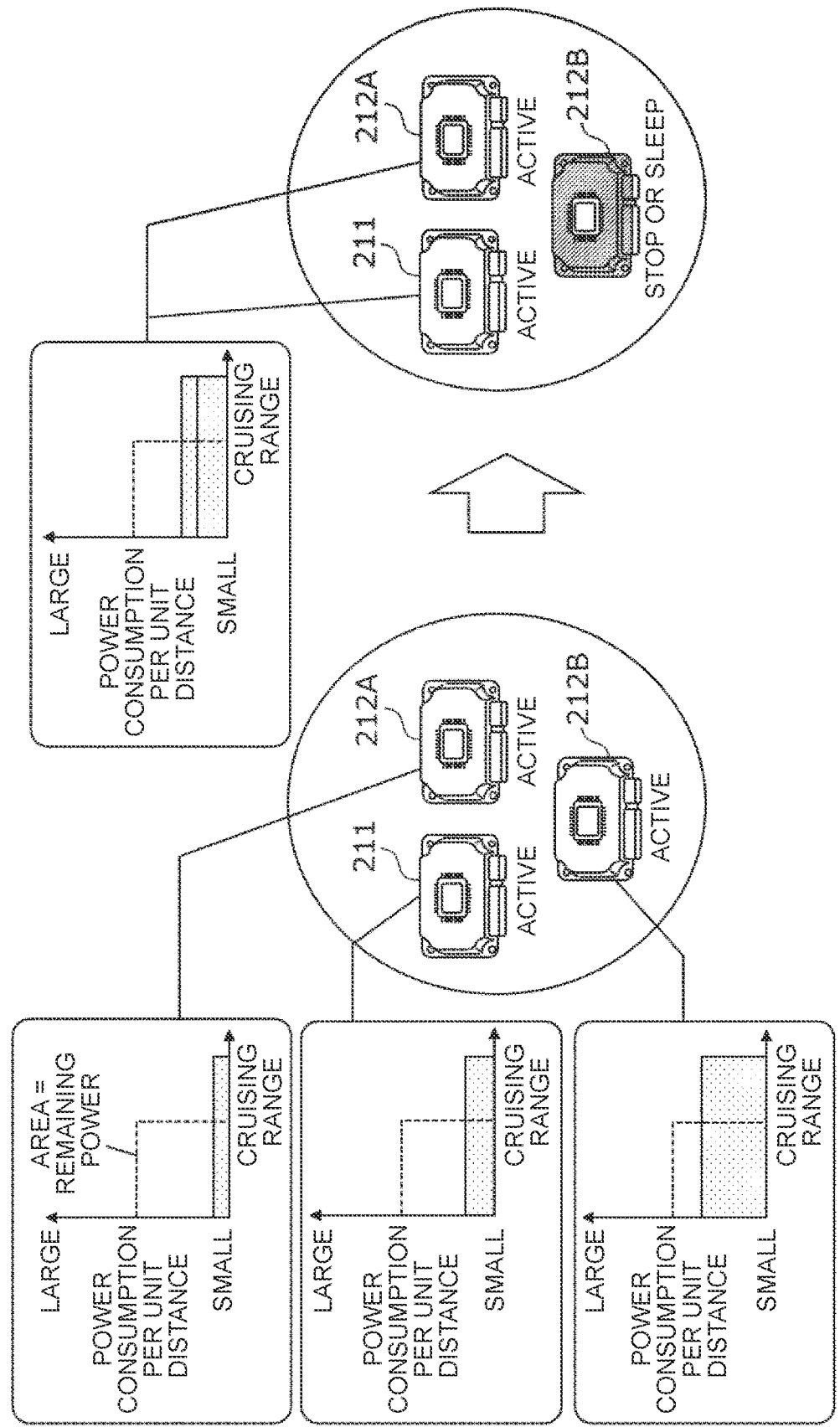

AUTONOMOUS DRIVING DEVICE, AUTONOMOUS DRIVING METHOD, AND NON-TRANSITORY STORAGE MEDIUM

CROSS-REFERENCE TO RELATED APPLICATION

This application claims priority to Japanese Patent Application No. 2021-058269 filed on Mar. 30, 2021, incorporated herein by reference in its entirety.

BACKGROUND

1. Technical Field

The present disclosure relates to autonomous driving devices, autonomous driving methods, and non-transitory storage media.

2. Description of Related Art

Japanese Unexamined Patent Application Publication No. 2018-077649 (JP 2018-077649 A) discloses a technique relating to remote control of an autonomous vehicle. According to this technique, when autonomous driving is difficult, the vehicle and remote control management equipment communicate with each other to remotely drive the vehicle by a remote operator.

SUMMARY

As a method for implementing autonomous driving and remote control in one vehicle, an electronic control unit (ECU) for autonomous driving and an ECU for remote control may be mounted separately. Since ECUs consume electric power, the overall power consumption increases with an increase in number of mounted ECUs. When an autonomous vehicle is an electrified vehicle (EV) that runs on electric power, the cruising range becomes shorter when it has large power consumption. Therefore, when the remaining power is low, it may be difficult for the vehicle to reach its destination.

The present disclosure provides a technique that enables a vehicle to continue to run and reach its destination even when the remaining power is low.

A first aspect of the present disclosure is an autonomous driving device. An autonomous driving device includes a plurality of driving function ECUs having a function to drive a vehicle in place of an occupant, and a driving function switch ECU is configured to individually change operating states of the driving function ECUs according to a route to a destination and remaining power. The driving function ECUs include an autonomous driving ECU configured to autonomously drive the vehicle, and a remote control ECU configured to operate the vehicle according to remote control from outside.

In the first aspect, the driving function switch ECU may be configured to shift a part of the driving function ECUs that are in operation out of the plurality of driving function ECUs to a power saving state when the vehicle is not going to reach the destination with the remaining power.

In the first aspect, the driving function switch ECU may be configured to preferentially shift the remote control ECU to the power saving state when the autonomous driving ECU and the remote control ECU are in operation.

In the first aspect, the driving function ECUs may be configured to stop or sleep in the power saving state.

In the first aspect, the autonomous driving ECU may have a long-time prediction mode in which the autonomous driving ECU predicts a distant future, and a short-time prediction mode in which the autonomous driving ECU predicts a near future. The autonomous driving ECU may be configured to normally operate in the long-time prediction mode and to operate in the short-time prediction mode in the power saving state.

In the first aspect, the remote control ECU may have a high-speed communication mode in which the remote control ECU communicates with the outside at a high communication speed, and a low-speed communication mode in which the remote control ECU communicates with the outside at a low communication speed. The remote control ECU may be configured to normally operate in the high-speed communication mode and to operate in the low-speed communication mode in the power saving state.

In the first aspect, the route to the destination may be changed when the vehicle is not going to reach the destination with the current remaining power. Specifically, the driving function switch ECU may be configured to select a combination of the route and the operating states of the driving function ECUs that enables the vehicle to reach the destination from the operating states of the driving function ECUs when the route is changed.

A second aspect of the present disclosure is an autonomous driving method. The autonomous driving method is a method for autonomously driving a vehicle by a plurality of driving function ECUs having a function to drive the vehicle in place of an occupant. The driving function ECUs includes an autonomous driving ECU configured to autonomously drive the vehicle, and a remote control ECU configured to operate the vehicle according to remote control from outside. The autonomous driving method includes: acquiring remaining power and a route to a destination; and individually changing operating states of the driving function ECUs according to the route to the destination and the remaining power.

A third aspect of the present disclosure is a non-transitory storage medium. The non-transitory storage medium stores instructions that are executable by a driving function switch ECU and that cause the driving function switch ECU to perform functions including switching operating states of a plurality of driving function ECUs according to remaining power and a route to a destination. The driving function ECUs have a function to drive a vehicle in place of an occupant. The driving function ECUs include an autonomous driving ECU configured to autonomously drive the vehicle, and a remote control ECU configured to operate the vehicle according to remote control from outside.

In the vehicle having the driving function ECUs, power consumption changes depending on the operating states of the driving function ECUs. According to the first, second, and third aspects of the present disclosure, the operating states of the driving function ECUs are individually changed according to the route to the destination and the remaining power. Accordingly, even when the remaining power is low, the vehicle can continue to run and reach the destination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 illustrates an example of a method for selecting which driving function ECU to operate and which driving function ECU to stop or put to sleep.

DETAILED DESCRIPTION OF EMBODIMENTS

Embodiments of the present disclosure will be described below with reference to the drawings. When the number, quantity, amount, range, etc. of each element are mentioned in the embodiments below, the technical idea of the present disclosure is not limited to the mentioned numerical values unless otherwise specified or unless the number, quantity, amount, range, etc. of the element are obviously limited to the mentioned numerical values in principle. The structures etc. that will be described in the following embodiments are not necessary to the technical idea of the present disclosure unless otherwise specified or unless the structures etc. are obviously limited to the mentioned structures etc. in principle.

1. Schematic Configuration of Remote Control System

Figure 1:
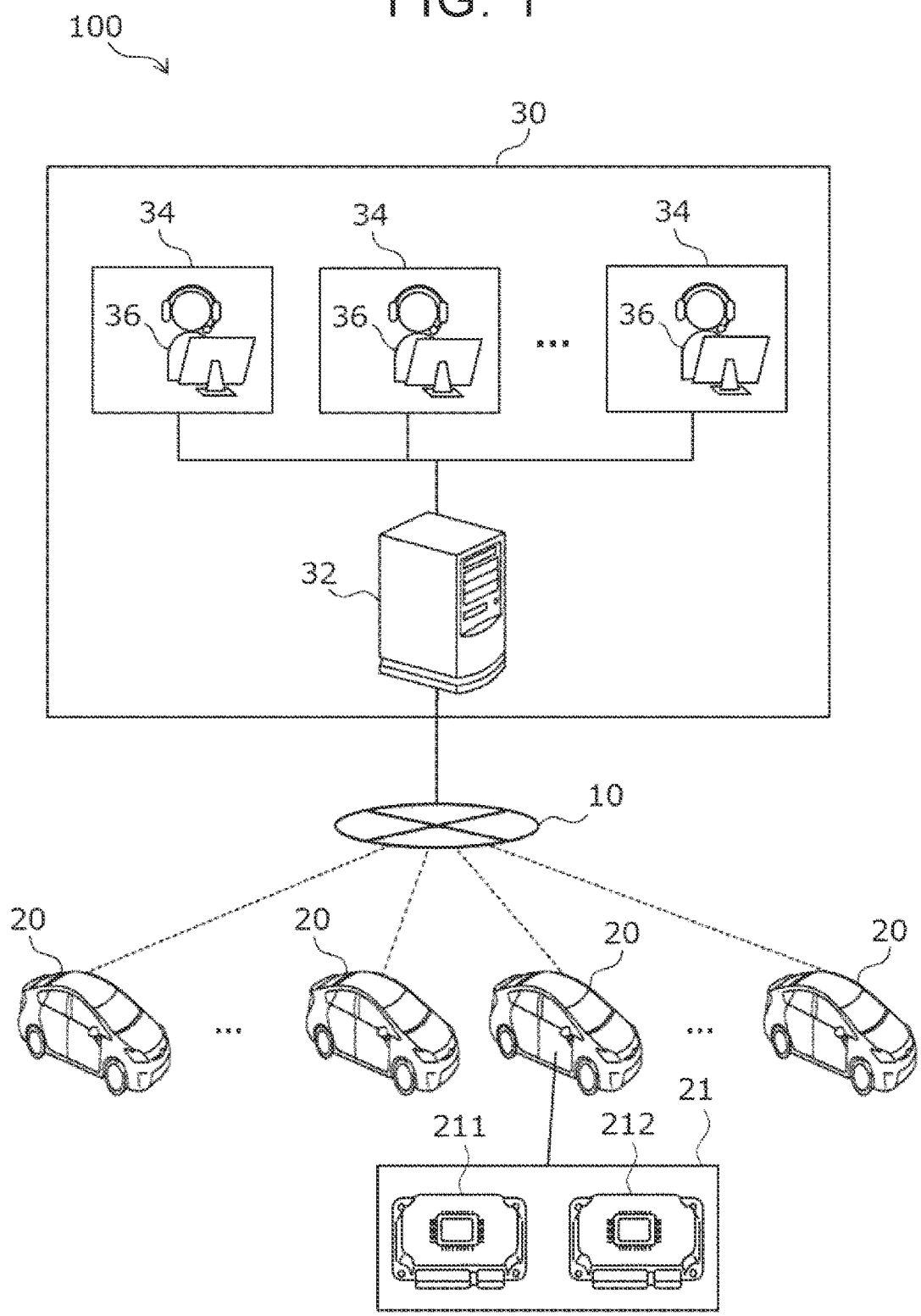
FIG. 1 schematically shows the configuration of a remote control system using an autonomous driving device according to an embodiment of the present disclosure.

FIG. 1 schematically shows the configuration of a remote control system common to the embodiments of the present disclosure. A remote control system 100 is a system for remotely controlling autonomous vehicles 20 from a remote control center 30. The remote control system 100 may be, for example, a system that provides a Mobility as a Service (MaaS) service using the autonomous vehicles 20. For example, the level of driving automation of the autonomous vehicle 20 may be Level 4 or Level 5. The autonomous vehicles 20 are electrified vehicles (EVs) that run on electric power stored in a battery such as a lithium ion battery or an all-solid-state battery. The autonomous vehicles 20 are hereinafter simply referred to as the "vehicles 20."

Each vehicle 20 is equipped with an autonomous driving device 21. The autonomous driving device 21 includes a plurality of driving function electronic control units (ECUs) having a function to drive the vehicle 20 in place of an occupant. The first driving function ECU is an autonomous driving ECU 211 that autonomously drives the vehicle 20. The second driving function ECU is a remote control ECU 212 that operates the vehicle 20 according to remote control from the outside.

The remote control in the present disclosure includes remote support and remote driving. The remote support and the remote driving are performed by a remote operator 36 based on a request from the vehicle 20 when the vehicle 20 has difficulty or is expected to have difficulty in continuing autonomous driving.

In the remote support, the remote operator 36 makes a part of determination for autonomous driving of the vehicle 20. Basic calculations related to perception, determination, and operation necessary for driving are performed in the vehicle 20. The remote operator 36 determines an action to be taken by the vehicle 20 based on information sent from the vehicle 20, and instructs the vehicle 20 to take the action. Remote support instructions to be sent from the remote operator 36 to the vehicle 20 includes an instruction to move the vehicle 20 and an instruction to stop the vehicle 20. The remote support instructions may further include an instruction for offset avoidance of an obstacle ahead, an instruction to pass a preceding vehicle, and an instruction for emergency evacuation.

In the remote driving, the remote operator 36 performs at least a part of driving of the vehicle 20, specifically, at least a part of a steering operation or an acceleration and deceleration operation. In the remote driving, the perception, determination, and operations necessary for driving are performed by the remote operator 36. The remote operator 36 drives the vehicle 20 from a remote place in the same manner as a driver sitting in a driver's seat of the vehicle 20 does. In the remote driving, the remote operator 36 need not always perform all of the perception, determination, and operations. At least a part of the perception, determination, and operations may be assisted by functions of the vehicle 20.

A server 32 and remote control terminals 34 are provided in the remote control center 30. The vehicles 20 are connected to the server 32 via a communication network 10 including 4th Generation (4G) and 5th Generation (5G). The number of vehicles 20 communicable with the server 32 is one or more, or two or more. The server 32 receives a remote control request made by any vehicle 20. The server 32 selects a remote operator 36 to respond to the remote control request based on details of the request (for example, whether the request is a remote support request or a remote driving request).

The remote control terminal 34 is an interface (human machine interface (HMI)) for the remote control by the remote operator 36. The remote control terminal 34 includes an information output unit that outputs, to the remote operator 36, information necessary for the remote control of the vehicle 20, and an operation input unit that receives operations for the remote control by the remote operator 36. Examples of the information output unit include a display that outputs images captured by a camera of the vehicle 20, and a loudspeaker that outputs sounds collected by a microphone of the vehicle 20. Examples of an operation input unit for remote support include buttons, levers, and a touch panel. Examples of an operation input unit for remote driving include a steering wheel, an accelerator pedal, a brake pedal, a turn signal lever, and a wiper lever. The remote control terminal 34 for remote driving and the remote control terminal 34 for remote support may be either separate terminals or a common terminal. At least one remote control terminal 34, or a plurality of remote control terminals 34, is provided. At the remote control center 30, remote operators 36 as many as the remote control terminals 34 are on standby.

Each remote control terminal 34 is connected to the server 32 via a communication network including a local area network (LAN) and the Internet. The remote control center 30 need not necessarily be a real facility. The system in which the remote control terminals 34 are connected to the server 32 via the communication network is herein referred to as the "remote control center 30." Therefore, the server 32 may be provided on a cloud, and the remote control terminals 34 may be provided at satellite offices in various places or homes of the remote operators 36.

2. Overview of Operation of Autonomous Driving Device

Figure 2:
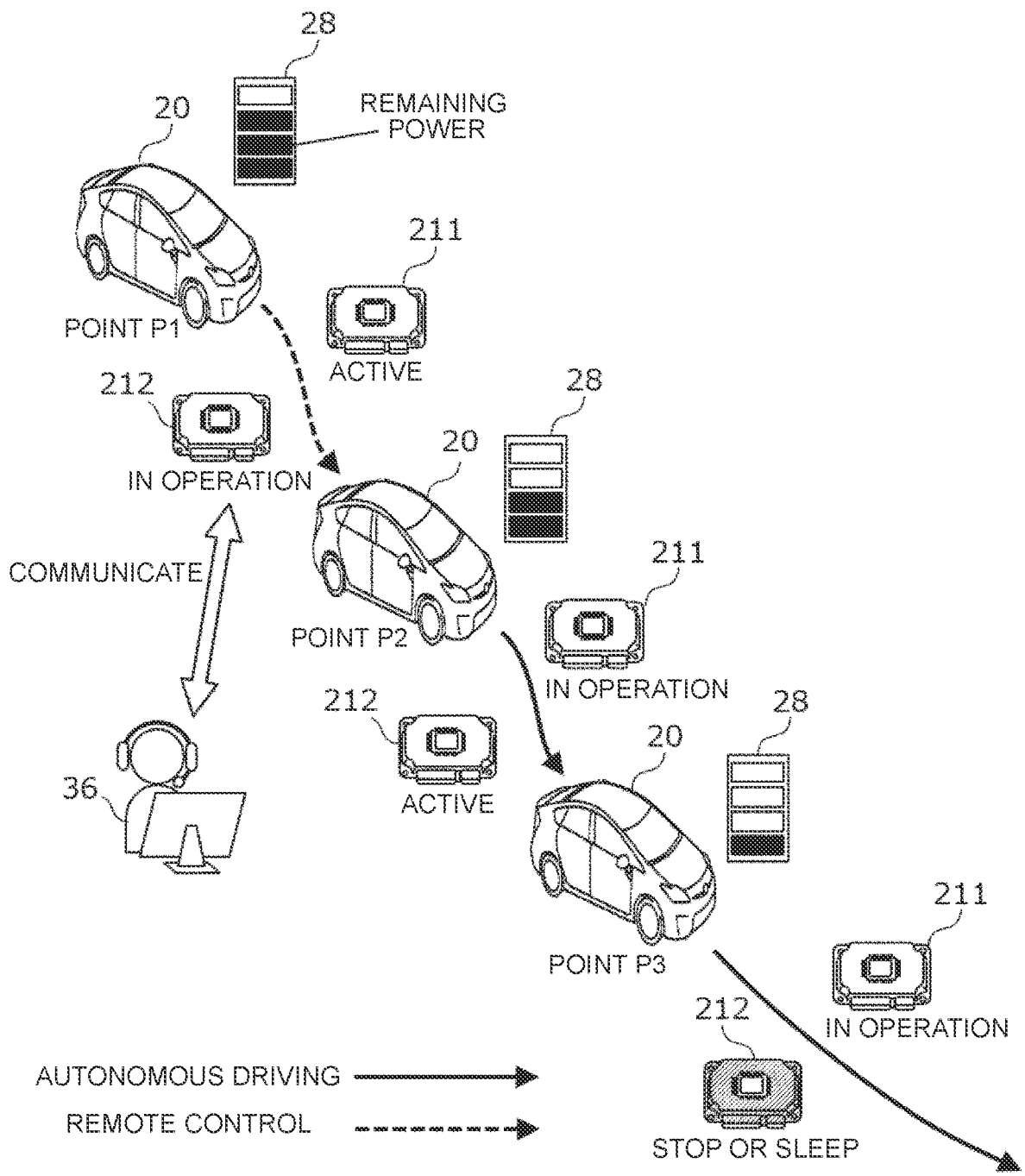
FIG. 2 illustrates an overview of operation of the autonomous driving device according to the embodiment of the present disclosure.

FIG. 2 illustrates an overview of operation of the autonomous driving device 21. In FIG. 2, arrow lines represent status of the vehicle 20 controlled by the autonomous driving device 21. A travel path of the vehicle 20 represented by a continuous arrow line indicates that the vehicle 20 is driven autonomously. A travel path of the vehicle 20 represented by a dashed arrow line indicates that the vehicle 20 is remotely controlled.

In the example shown in FIG. 2, the vehicle 20 is remotely controlled from a point P1 to a point P2. The remote control of the vehicle 20 is performed by the remote control ECU 212 in response to instructions from the remote operator 36. Specifically, the remote operator 36 and the remote control ECU 212 communicate with each other, and the remote control ECU 212 operates the vehicle 20 in response to instructions received from the remote operator 36.

The autonomous driving function is not used during the remote control. Therefore, one way to reduce power consumption is to stop the autonomous driving ECU 211 or put the autonomous driving ECU 211 to sleep. However, when the autonomous driving ECU 211 is stopped or put to sleep during remote control, the vehicle 20 cannot be smoothly switched to autonomous driving if, for example, the remote control cannot be continued due to interruption of communication. That is, continuity in driving of the vehicle 20 cannot be maintained. Therefore, the autonomous driving device 21 keeps the autonomous driving ECU 211 active while the remote control ECU 212 is performing remote control.

Since both the autonomous driving ECU 211 and the remote control ECU 212 are active, the vehicle 20 is smoothly switched from remote control to autonomous driving at the point P2. The remote control function is not used during autonomous driving. However, in order to immediately respond to a situation that cannot be handled by autonomous driving but can be handled only by remote control, it is desirable to keep the remote control ECU 212 active even while the autonomous driving ECU 211 is performing autonomous driving. Since the remote control ECU 212 is kept active in advance, remote control can be started earlier than when the remote control ECU 212 is started from sleep, in the case where autonomous driving can no longer be continued and remote control by the remote operator 36 is necessary.

However, power consumption is larger when both the autonomous driving ECU 211 and the remote control ECU 212 are active than when only one of them is active. The vehicle 20 is traveling toward its destination, and the amount of electric power required for the vehicle 20 to travel to the destination depends on the route to the destination and the power consumption. When the remaining power of a battery 28 mounted on the vehicle 20 is not sufficient, the vehicle 20 may not be able to reach the destination as the power is consumed by the autonomous driving ECU 211 and the remote control ECU 212.

Therefore, the autonomous driving device 21 predicts from the route to the destination and the remaining power of the battery 28 whether the vehicle 20 will be able to reach the destination with both the autonomous driving ECU 211 and the remote control ECU 212 kept active. When the autonomous driving device 21 predicts that it will be difficult for the vehicle 20 to reach the destination, the autonomous driving device 21 reduces power consumption by individually changing the operating states of the autonomous driving ECU 211 and the remote control ECU 212. However, the premise is that the vehicle 20 is caused to travel to the destination. Accordingly, it is not possible to keep the remote control ECU 212 active and stop the autonomous driving ECU 211 or put the autonomous driving ECU 211 to sleep in, for example, an environment where remote control cannot be performed. The autonomous driving device 21 individually changes the operating states of the autonomous driving ECU 211 and the remote control ECU 212 while ensuring the driving function of either the autonomous driving ECU 211 or the remote control ECU 212.

In the example shown in FIG. 2, the autonomous driving device 21 stops the remote control ECU 212 or puts the remote control ECU 212 to sleep at a point P3 while continuing autonomous driving by the autonomous driving ECU 211. This means that the autonomous driving device 21 determines at the point P3 that the vehicle 20 cannot reach the destination if both the autonomous driving ECU 211 and the remote control ECU 212 are kept active, and that the vehicle 20 can travel the remaining route to the destination by autonomous driving. By stopping the remote control ECU 212 or putting the remote control ECU 212 to sleep, power consumption is reduced, and the rate of decrease in remaining power of the battery 28 is reduced. This enables the vehicle 20 to reach the destination.

Whether to stop the remote control ECU 212 or put the remote control ECU 212 to sleep may be determined according to the remaining power of the battery 28. For example, the autonomous driving device 21 stops the remote control ECU 212 when the remaining power is obviously not enough for the vehicle 20 to reach the destination, and puts the remote control ECU 212 to sleep when the remaining power is enough for the vehicle 20 to reach the destination. In some embodiments, in view of the possibility that remote control may become temporarily necessary during autonomous driving, the remote control ECU 212 may be put into sleep mode as the remote control ECU 212 can be started more quickly from sleep mode although it consumes standby power.

3. Configuration of Autonomous Driving Device

Figure 3:
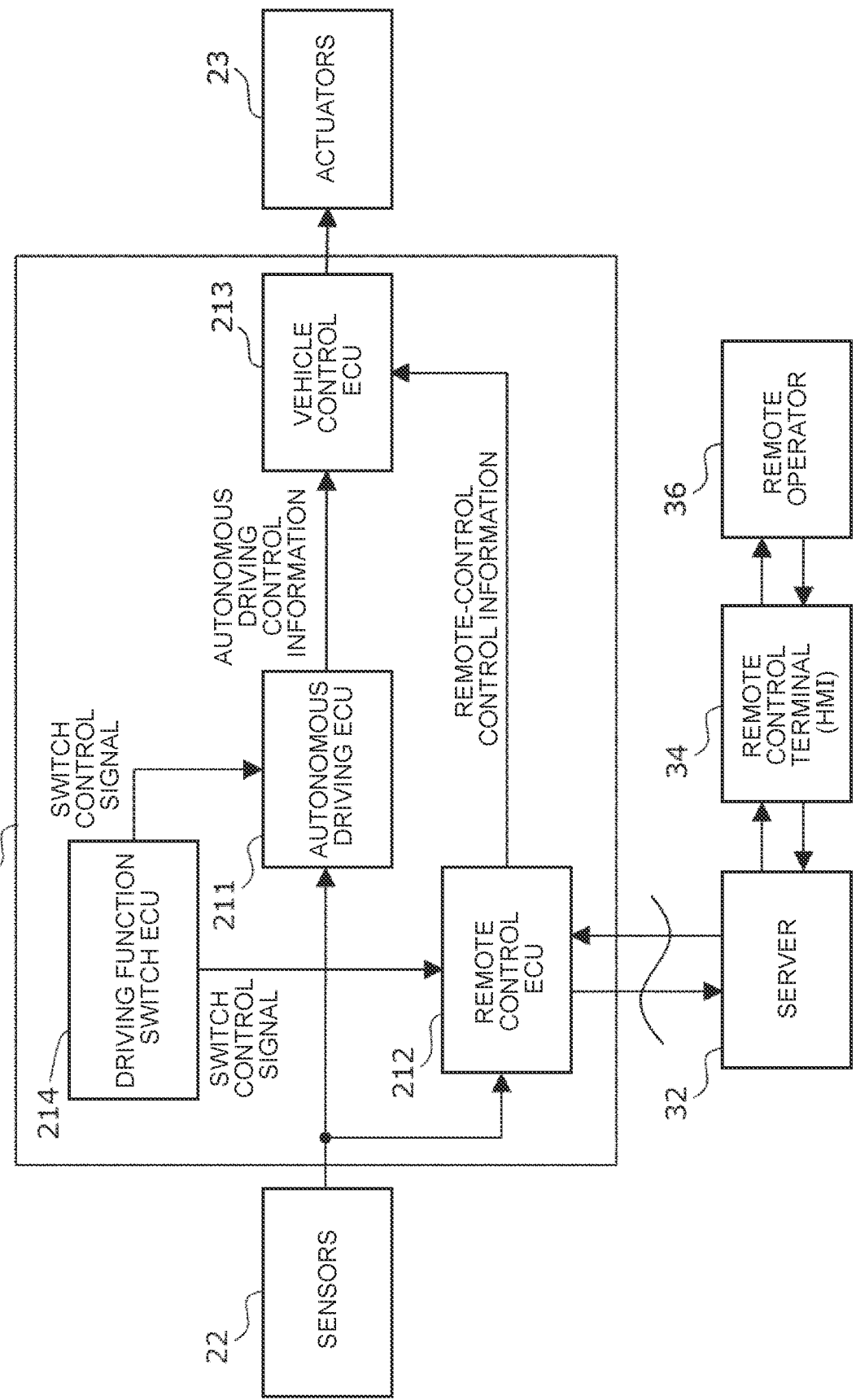
FIG. 3 is a block diagram showing an example of the configuration of the autonomous driving device according to the embodiment of the present disclosure.

The configuration of the autonomous driving device 21 capable of implementing each operating state of the autonomous driving ECU 211 and the remote control ECU 212 in FIG. 2 will be described with reference to FIG. 3. FIG. 3 is a block diagram showing an example of the configuration of the autonomous driving device 21.

A plurality of sensors 22 is connected to the autonomous driving device 21 using an in-vehicle network such as a controller area network (CAN). The sensors 22 include a Light Detection and Ranging (LiDAR) sensor, a camera, and a millimeter wave sensor that serve as perception sensors for perceiving the surroundings of the vehicle 20. The camera may be used for both autonomous driving and remote control, or different cameras may be provided for autonomous driving and remote control. The sensors 22 further include a Global Positioning System (GPS) receiver that serves as a position sensor for detecting the position and orientation of the vehicle 20. The sensors 22 further include a state sensor that acquires information about motion of the vehicle 20. Examples of the state sensor include a wheel speed sensor, an acceleration sensor, an angular velocity sensor, and a steering angle sensor.

A plurality of actuators 23 is connected to the autonomous driving device 21 using the in-vehicle network such as the CAN. The actuators 23 include a steering device that steers the vehicle 20, a driving device that drives the vehicle 20, and a braking device that brakes the vehicle 20. Examples of the steering device include a power steering system, a steer-by-wire steering system, and a rear wheel steering system. The drive device is an EV system that drives an electric motor with electricity stored in the battery 28. Examples of the braking device include a hydraulic brake and a regenerative brake. The actuators 23 also include devices such as turn signals and wipers that need to be operated for safe traveling of the vehicle 20. The actuators 23 operate in response to control signals sent from the autonomous driving device 21.

The autonomous driving device 21 includes the autonomous driving ECU 211, the remote control ECU 212, a vehicle control ECU 213, and a driving function switch ECU 214. The ECUs 211, 212, 213, and 214 are connected using the in-vehicle network such as the CAN. Each of the ECUs 211, 212, 213, and 214 includes a processor and a memory coupled to the processor. The memory stores one or more programs executable by the processor and various kinds of information related to the program(s). The processor implements various processes by executing the program(s). The memory includes a main storage device and an auxiliary storage device. The auxiliary storage device includes various databases including a map database.

The autonomous driving ECU 211 determines whether autonomous driving can be performed, based on various kinds of detection information received from the sensors 22 and, if necessary, information acquired from the various databases in the storage device. When the autonomous driving ECU 211 determines that autonomous driving can be performed, the autonomous driving ECU 211 generates control information for autonomous driving (hereinafter referred to as the "autonomous driving control information") based on various kinds of detection information received from the sensors 22 and, if necessary, information acquired from the various databases in the storage device. A predetermined method can be used to generate the autonomous driving control information. An example of the method will be described.

First, the position of the vehicle 20 on a map is perceived based on position information of the vehicle 20 received by the GPS receiver, information about motion of the vehicle 20 detected by the state sensor, and map information acquired from the map database. Detection information is acquired from the LiDAR sensor, the camera, and the millimeter wave sensor. Objects around the vehicle 20 are perceived from the detection information by using a technique such as pattern matching or deep learning, and the positions and types of the objects are identified. The objects whose positions and types are identified are output as targets. Next, a travel plan of the vehicle 20 including a route to the destination is created based on target information and the map information recorded in the map database. The travel plan is created so that the vehicle 20 travels suitably on the route in light of references such as safety, legal compliance, and travel efficiency. Next, a target trajectory is generated based on the travel plan. The target trajectory includes a set of target positions of the vehicle 20 in a coordinate system fixed to the vehicle 20 and a target speed at each target point. The autonomous driving ECU 211 outputs the target trajectory thus generated as the autonomous driving control information.

The remote control ECU 212 communicates with the server 32 and sends information necessary for remote control to the server 32. The information that is sent to the server 32 includes various kinds of detection information received from the sensors 22, including an image captured by the camera, and if necessary, information acquired from the various databases in the storage device. The information that is sent to the server 32 may include information acquired from the outside of the remote control system 100, such as road traffic information acquired from a road traffic information system, when this information is useful for the remote control. The information sent from the remote control ECU 212 to the server 32 is processed by the server 32 and sent to the remote control terminal 34.

The remote control ECU 212 communicates with the server 32 and receives a remote control signal for remote control from the server 32. The remote control signal is a signal input to the remote control terminal 34 by the remote operator 36. When remote driving is performed, the remote control signal is, for example, a remote driving signal generated through a steering operation or a pedal operation. When remote support is performed, the remote control signal is, for example, a remote support signal generated through an operation of a button or lever. The remote control ECU 212 generates control information for remote control (hereinafter referred to as the "remote-control control information") based on the remote control signal received from the server 32. The remote-control control information may be any information as long as the vehicle 20 can be controlled.

The vehicle control ECU 213 calculates an actuator controlled variable of each actuator 23 according to the autonomous driving control information sent from the autonomous driving ECU 211 or the remote-control control information sent from the remote control ECU 212. However, when the control information that is used to calculate the actuator controlled variables is discontinuously switched during transition from autonomous driving to remote control or during transition from remote control to autonomous driving, the behavior of the vehicle 20 becomes unstable during switching of the control information, which may cause discomfort to a passenger(s). Therefore, during transition from autonomous driving to remote control or during transition from remote control to autonomous driving, the vehicle control ECU 213 performs calculations to continuously switch the control information so that the actuator controlled variables change smoothly.

The driving function switch ECU 214 switches the operating states of the autonomous driving ECU 211 and the remote control ECU 212. As described above, the basic operating state of both the autonomous driving ECU 211 and the remote control ECU 212 is an active state. When it is necessary to change the operating state of either or both of the autonomous driving ECU 211 and the remote control ECU 212 in order for the vehicle 20 to reach the destination, the driving function switch ECU 214 sends a switch control signal to the driving function ECU(s) whose operating state is to be changed. In the next section, the configuration of the driving function switch ECU 214 will be described in more detail.

4. Configuration of Driving Function Switch ECU

Figure 4:
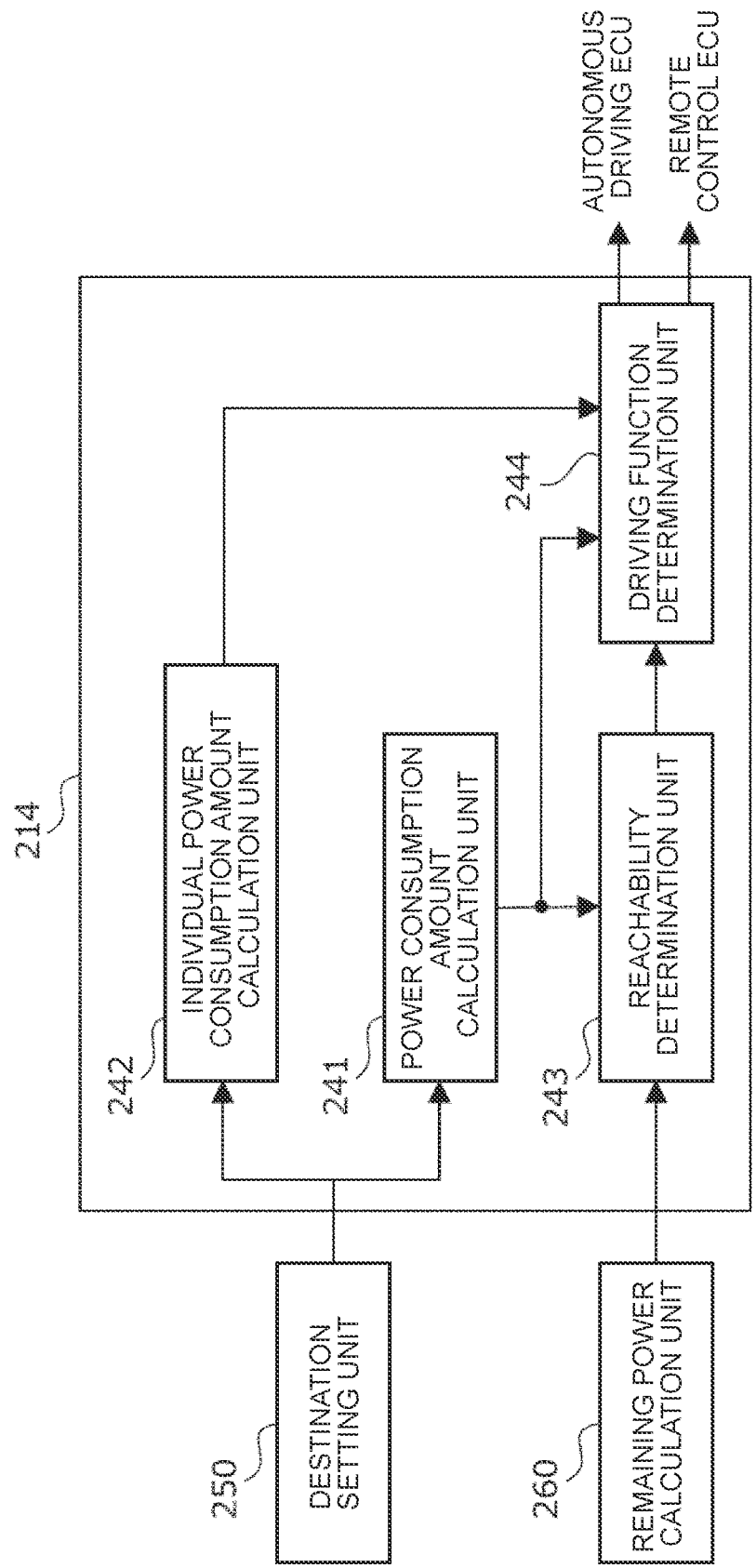
FIG. 4 is a block diagram showing an example of the configuration of a driving function switch electronic control unit (ECU) according to the embodiment of the present disclosure.

FIG. 4 is a block diagram showing an example of the configuration of the driving function switch ECU 214. The driving function switch ECU 214 includes a power consumption amount calculation unit 241, an individual power consumption amount calculation unit 242, a reachability determination unit 243, and a driving function determination unit 244. These units are implemented as functions of the driving function switch ECU 214 when the processor of the driving function switch ECU 214 executes the program(s) stored in the memory of the driving function switch ECU 214.

The power consumption amount calculation unit 241 calculates the amount of power consumed by the driving function ECU(s) currently in operation until the vehicle 20 reaches the destination (hereinafter this amount of power is referred to as the "power consumption amount"). The power consumption amount depends on the route from the current location to the destination and the power consumption of the driving function ECU(s) that operates until the vehicle 20 reaches the destination. Information about the destination and the route from the current location to the destination (hereinafter referred to as the "destination information") is acquired from a destination setting unit 250 located outside the driving function switch ECU 214. The power consumption amount calculation unit 241 assumes that the driving function ECU(s) currently in operation is the driving function ECU(s) that operates until the vehicle 20 reaches the destination, and acquires power consumption from the driving function ECU(s) currently in operation. Power consumption varies depending on the calculation load condition. The power consumption amount calculation unit 241 acquires the current total power consumption of all the driving function ECUs that are active out of the two driving function ECUs. That is, the power consumption amount calculation unit 241 acquires the total power consumption under the current load condition.

The destination setting unit 250 is typically a navigation system. The destination is, for example, a destination in the case of a bus service, or a designated place desired by a customer in the case of a taxi. However, these places may be regarded as waypoints, and the following other places may be set as destinations.

(1) A Place where the Vehicle 20 can be Charged

Since the vehicle 20 needs to be charged after dropping a passenger(s) off, a place where the vehicle 20 can be charged may be set as a destination.

(2) A Place where a Driver can Take Over Driving of the Vehicle 20

A place where a driver can take over driving of the vehicle 20 may be set as a destination so as to avoid such a situation that the vehicle 20 can use neither the autonomous driving function nor the remote control function and gets stuck.

(3) A Place where a Customer of the Vehicle 20 can be Handed Over to Another Vehicle Even if the vehicle 20 gets stuck and cannot move, it can be considered that the minimum MaaS service is provided if a passenger(s) can continue to use the service. Therefore, for example, a meeting point with another service vehicle may be determined, and after the vehicle 20 drives a passenger(s) to the meeting point by the autonomous driving function or the remote control function, the passenger(s) may be requested to change vehicles, and the vehicle 20 may stop at a place where the vehicle 20 does not obstruct the traffic flow and wait for maintenance.

(4) A Place Associated with Arrival Time and Point Information

For example, when the vehicle 20 is a vehicle that goes round in a circle like a bus, it is important for the vehicle 20 to arrive at a certain point at a certain time. Accordingly, the destination may be set based on information linking the time and the point.

The individual power consumption amount calculation unit 242 individually calculates for each of the two driving function ECUs the amount of power consumed by the driving function ECU when the driving function ECU operates from the current location to the destination (hereinafter this amount of power is referred to as the "individual power consumption amount"). The power consumption amount calculation unit 241 calculates the total power consumption amount of all the driving function ECUs that are currently in operation, whereas the individual power consumption amount calculation unit 242 calculates the individual power consumption amounts of all the driving function ECUs including the driving function ECU that is currently not in operation. An example of a method for calculating the individual power consumption amount is to register in advance the "power consumption per unit distance (Wh/m)" of each driving function ECU in the database and output the power consumption (Wh) according to the distance to the destination included in the destination information. When power consumption varies with time, the power consumption amount may be calculated using data such as maximum, average, and median values.

When the driving function ECU has a plurality of operation modes, the individual power consumption amount is calculated for each operation mode. Examples of an element that switches the operation mode include switching the number of clocks of the processor and changing the number of cores to be used for calculations.

The autonomous driving ECU 211 may have a long-time prediction mode in which the autonomous driving ECU 211 predicts a relatively distant future in calculation of a target trajectory, and a short-time prediction mode in which the autonomous driving ECU 211 predicts only a relatively near future in calculation of a target trajectory. In the long-time prediction mode, the vehicle 20 can run smoothly because it travels along a target trajectory created up to a distant place, but the power consumption of the autonomous driving ECU 211 is large because the amount of calculation is large. On the other hand, in the short-time prediction mode, the vehicle 20 does not run smoothly because the vehicle travels along a target trajectory created only up to a nearby place, but the power consumption of the autonomous driving ECU 211 is small because the amount of calculation is small. In this case, the individual power consumption amount calculation unit 242 separately calculates the individual power consumption amount of the autonomous driving ECU 211 in the long-time prediction mode and the individual power consumption amount of the autonomous driving ECU 211 in the short-time prediction mode.

The remote control ECU 212 may have a high-speed communication mode in which the remote control ECU 212 communicates with the server 32 at a relatively high communication speed, and a low-speed communication mode in which the remote control ECU 212 communicates with the server 32 at a relatively low communication speed. In the high-speed communication mode, a smooth camera image can be displayed on the display of the remote control terminal 34, but the power consumption of the remote control ECU 212 is large because the amount of calculation is large. On the other hand, in the low-speed communication mode, the resolution of the camera image displayed on the display of the remote control terminal 34 is reduced, but the power consumption of the remote control ECU 212 is small because the amount of calculation is small. In this case, the individual power consumption amount calculation unit 242 separately calculates the individual power consumption amount of the remote control ECU 212 in the high-speed communication mode and the individual power consumption amount of the remote control ECU 212 in the low-speed communication mode.

The reachability determination unit 243 acquires the remaining power of the battery 28 from a remaining power measurement unit 260 located outside the driving function switch ECU 214, and also acquires the power consumption amount from the power consumption amount calculation unit 241. When the power consumption amount is equal to or smaller than the remaining power of the battery 28, it is very likely that the vehicle 20 can reach the destination. On the other hand, when the power consumption amount is larger than the remaining power of the battery 28, it is more likely that the vehicle 20 cannot reach the destination. The reachability determination unit 243 compares the remaining power and the power consumption amount to determine whether the vehicle 20 can reach the destination with the driving function ECUs kept in their current operating states.

The remaining power measurement unit 260 is typically a battery manager that manages the state of the battery 28. The remaining power measured by the remaining power measurement unit 260 is ideally the remaining amount of power that can be used by the driving function. For example, when power is consumed even by the use of an air conditioner, it is desirable to calculate the remaining power that can be used only by the driving function, by taking the amount of power consumed by the air conditioner into consideration. The amount of power consumed by the air conditioner can be calculated based on the predicted temperature for each place and time. When it is necessary to put the vehicle 20 into a garage after it arrives at the destination, it is desirable to calculate the remaining power that can be used only by the driving function, by taking also the amount of power required to move the vehicle 20 from a drop-off location to the garage into consideration. When calculating the remaining power that can be used only by the driving function, a more accurate arrival time may be estimated by using traffic congestion information, accident information, construction information, etc.

The driving function determination unit 244 determines the operating states of the two driving function ECUs based on the information acquired from the reachability determination unit 243, the power consumption amount calculation unit 241 and the individual power consumption amount calculation unit 242. The driving function determination unit 244 acquires from the reachability determination unit 243 the determination result of whether the vehicle 20 can reach the destination with the driving function ECUs kept in their current operating states. The driving function determination unit 244 acquires from the power consumption amount calculation unit 241 the information about the driving function ECU(s) that is currently in operation. The driving function determination unit 244 acquires the individual power consumption amounts of the two driving function ECUs from the individual power consumption amount calculation unit 242.

When the determination result acquired from the reachability determination unit 243 indicates that the vehicle 20 can reach the destination with the driving function ECUs kept in their current operating states, the driving function determination unit 244 determines to keep operating the driving function ECU(s) that is currently in operation. On the other hand, when the determination result acquired from the reachability determination unit 243 indicates that the vehicle 20 cannot reach the destination with the driving function ECUs kept in their current operating states, the driving function determination unit 244 determines which driving function ECU to operate and which driving function ECU not to operate based on the individual power consumption amounts of the two driving function ECUs. The driving function determination unit 244 sends a switch control signal to the driving function ECU(s) whose operating state is to be changed according to the determination result.

Figure 5:
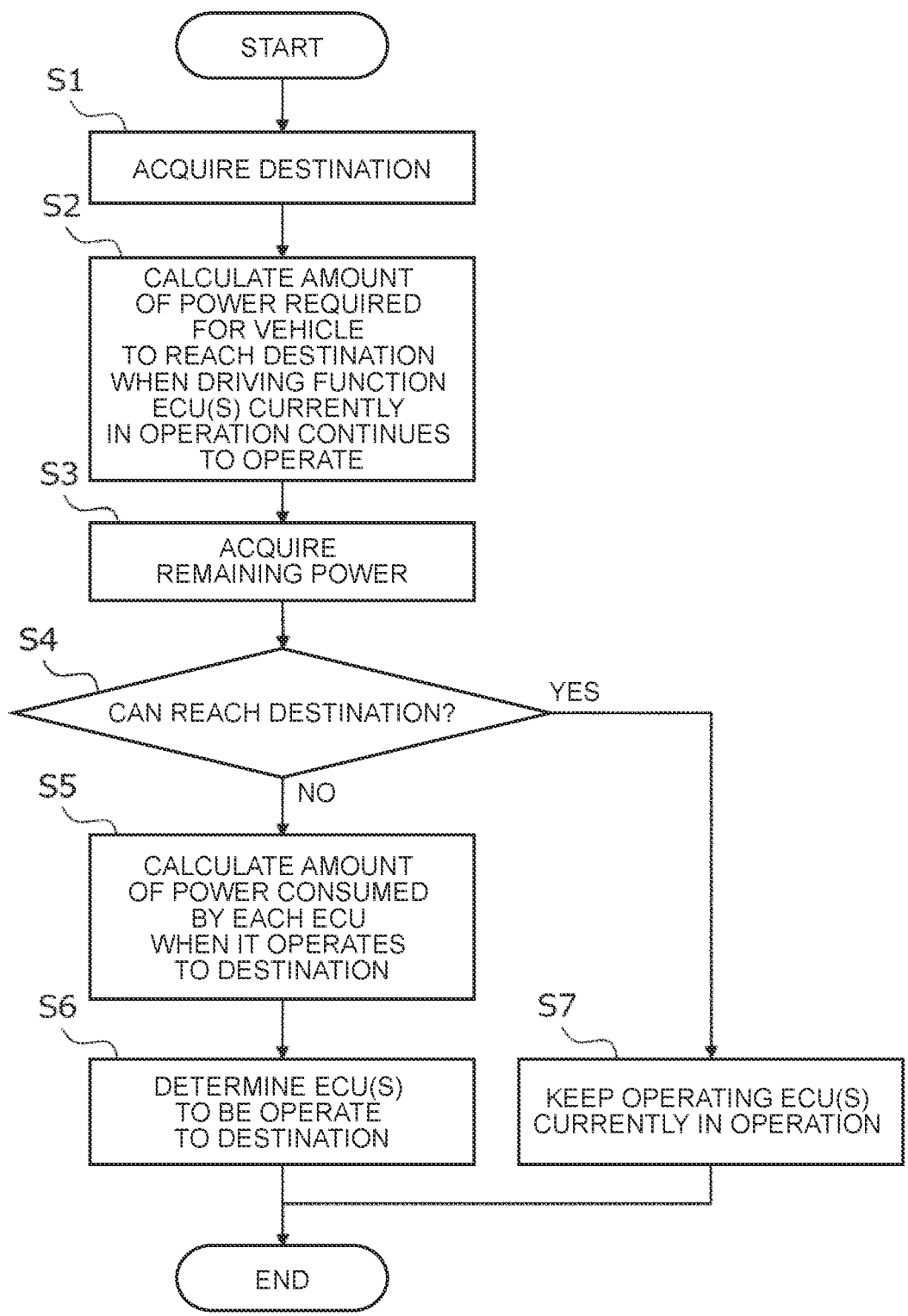
FIG. 5 is a flowchart illustrating an autonomous driving method according to the embodiment of the present disclosure.

An autonomous driving method shown in the flowchart of FIG. 5 is implemented by using the driving function switch ECU configured as described above. In step S1 of this autonomous driving method, destination information is acquired. In step S2, the amount of power required for the vehicle 20 to reach the destination when the driving function ECU(s) that is currently in operation continues to operate, that is, the power consumption amount, is calculated based on the destination information. In step S3, the remaining power of the battery 28 is acquired.

Thereafter, in step S4, it is determined based on the power consumption amount calculated in step S2 and the remaining power acquired in step S3 whether the vehicle 20 can reach the destination with the driving function ECUs kept in their current operating states. When Yes in step S4, the routine proceeds to step S7. In step S7, it is determined that the driving function ECU(s) that is currently in operation is kept operating.

When No in step S4, the routine proceeds to step S5. In step S5, the amount of power consumed by the driving function ECU when the driving function ECU operates until the vehicle 20 reaches the destination, namely the individual power consumption amount of the driving function ECU, is calculated for each driving function ECU. In step S6, the driving function ECU(s) to be operated until the vehicle 20 reaches the destination is determined based on the remaining power acquired in step S3 and the individual power consumption amounts of the driving function ECUs calculated in step S5.

According to the above autonomous driving method, the operating states of the driving function ECUs are individually changed according to the route to the destination and the remaining power. The vehicle 20 can therefore continue to run and reach the destination even when the remaining power is low.

5. Specific Examples of Changing Operating States of Driving Function ECUs

As described above, the autonomous driving device 21 individually changes the operating states of the driving function ECUs according to the route to the destination and the remaining power of the battery 28. Hereinafter, specific examples of changing the operating states of the driving function ECUs included in the autonomous driving device 21, that is, the autonomous driving ECU 211 and the remote control ECU 212, will be described with reference to FIGS. 6 to 10.

Figure 6:
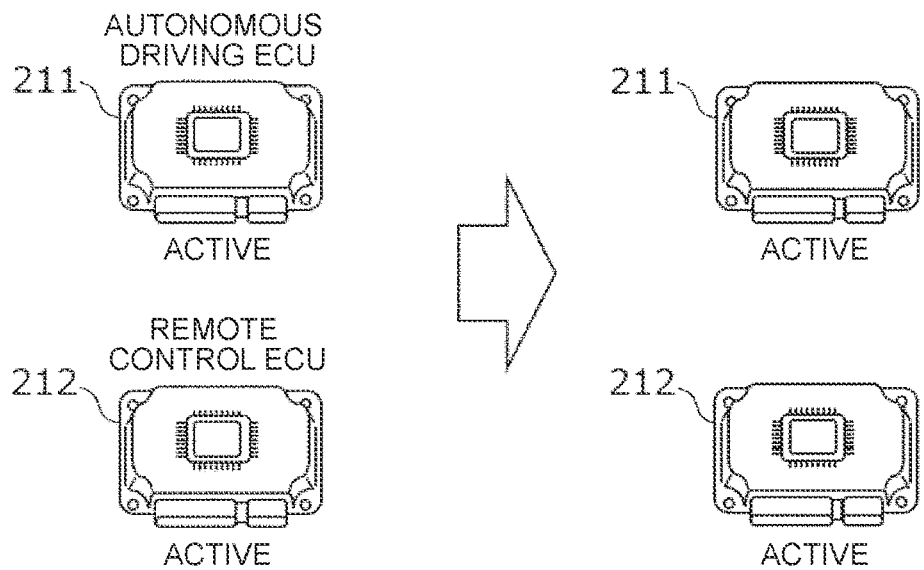
FIG. 6 shows a first specific example of changing the operating states of driving function ECUs when the driving function ECUs are an autonomous driving ECU and a remote control ECU.

FIG. 6 shows a specific example in which both the autonomous driving ECU 211 and the remote control ECU 212 are active and it is determined that the vehicle 20 can reach the destination with the autonomous driving ECU 211 and the remote control ECU 212 kept in their current operating states. In this case, since both the autonomous driving ECU 211 and the remote control ECU 212 are kept active, both the autonomous driving function and the remote control function can be used until the vehicle 20 reaches the destination.

Figure 7:
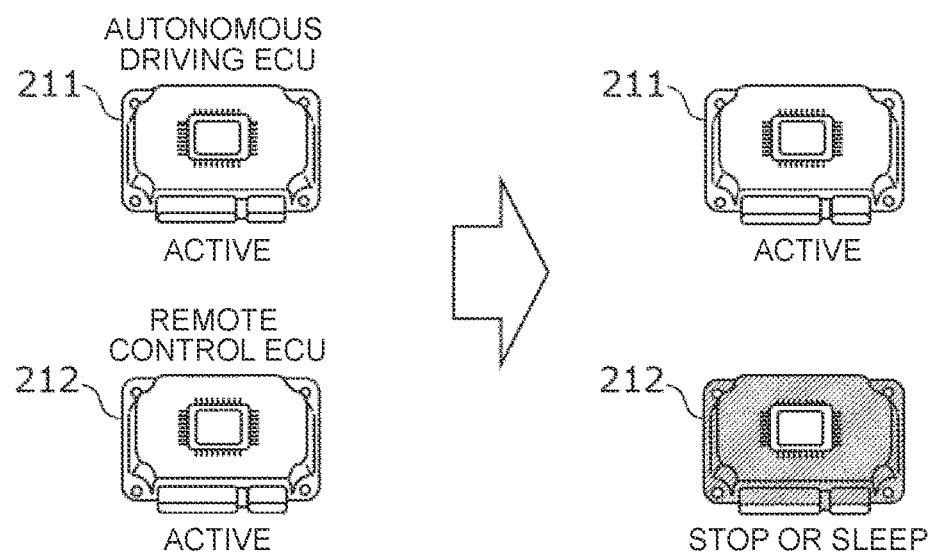
FIG. 7 shows a second specific example of changing the operating states of the driving function ECUs when the driving function ECUs are the autonomous driving ECU and the remote control ECU.

FIG. 7 shows a specific example in which both the autonomous driving ECU 211 and the remote control ECU 212 are active and it is determined that the vehicle 20 cannot reach the destination with the autonomous driving ECU 211 and the remote control ECU 212 kept in their current operating states. In this example, the autonomous driving ECU 211 is kept active, and the remote control ECU 212 is stopped or put to sleep. It is also possible to stop the autonomous driving ECU 211 or put the autonomous driving ECU 211 to sleep and keep the remote control ECU 212 active. However, since remote control requires a remote operator 36, labor costs are incurred. Therefore, in some embodiments, in view of the costs related to the operation of the vehicle 20, the autonomous driving function may be used as much as possible whenever the autonomous driving function can be used.

Figure 8:
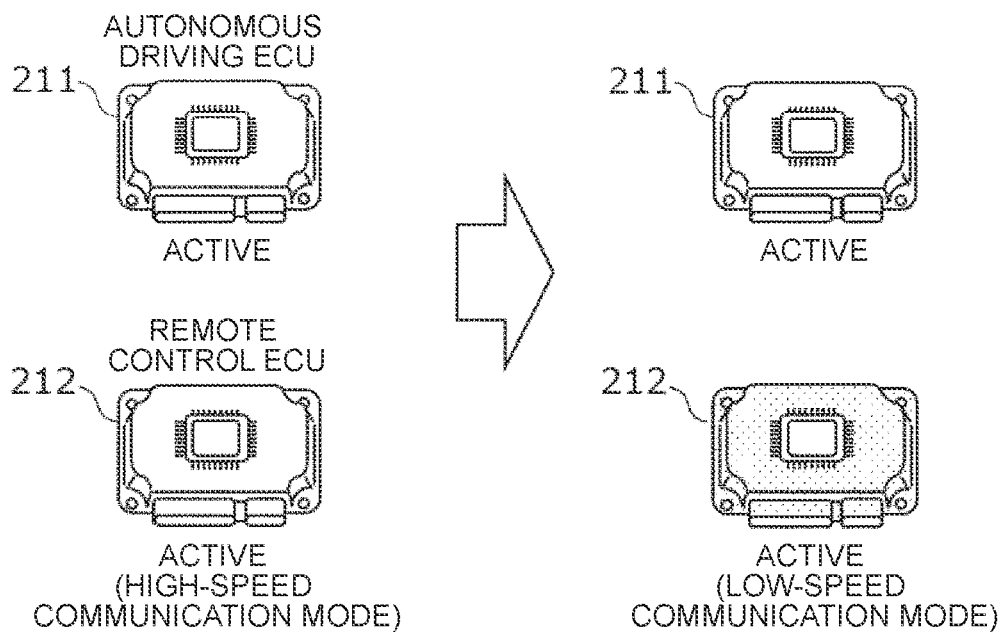
FIG. 8 shows a third specific example of changing the operating states of the driving function ECUs when the driving function ECUs are the autonomous driving ECU and the remote control ECU.

FIG. 8 shows a specific example in which both the autonomous driving ECU 211 and the remote control ECU 212 are active and it is determined that the vehicle 20 cannot reach the destination with the autonomous driving ECU 211 and the remote control ECU 212 kept in their current operating states. In this example, the autonomous driving ECU 211 is kept active, and the remote control ECU 212 is also kept active. However, the remote control ECU 212 is changed from the high-speed communication mode that is normally used to the low-speed communication mode in which power consumption can be reduced. In this case, although the resolution of the camera image displayed on the display of the remote control terminal 34 is reduced, not only the autonomous driving function but also the remote control function can be used until the vehicle 20 reaches the destination.

Figure 9:
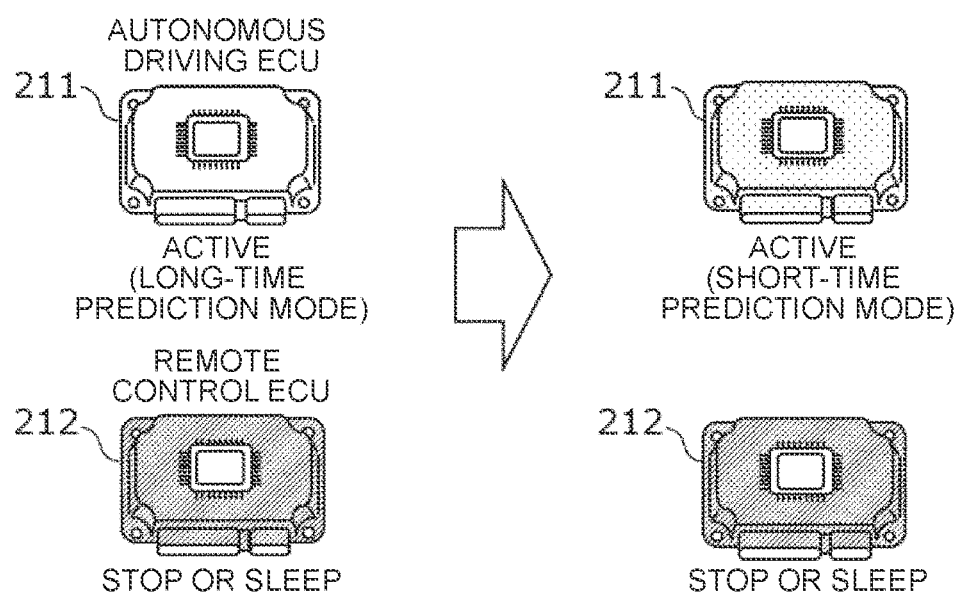
FIG. 9 shows a fourth specific example of changing the operating states of the driving function ECUs when the driving function ECUs are the autonomous driving ECU and the remote control ECU.

FIG. 9 shows a specific example in which the autonomous driving ECU 211 is active and the remote control ECU 212 is in a power saving state (stopped or put to sleep) and it is determined that the vehicle 20 cannot reach the destination with the autonomous driving ECU 211 and the remote control ECU 212 kept in their current operating states. In this example, the remote control ECU 212 is kept in the power saving state, and the autonomous driving ECU 211 is kept active. However, the autonomous driving ECU 211 is changed from the long-time prediction mode that is normally used to the short-time prediction mode in which power consumption can be reduced. In this case, although the vehicle 20 does not run smoothly, the autonomous driving function can be used until the vehicle 20 reaches the destination.

Figure 10:
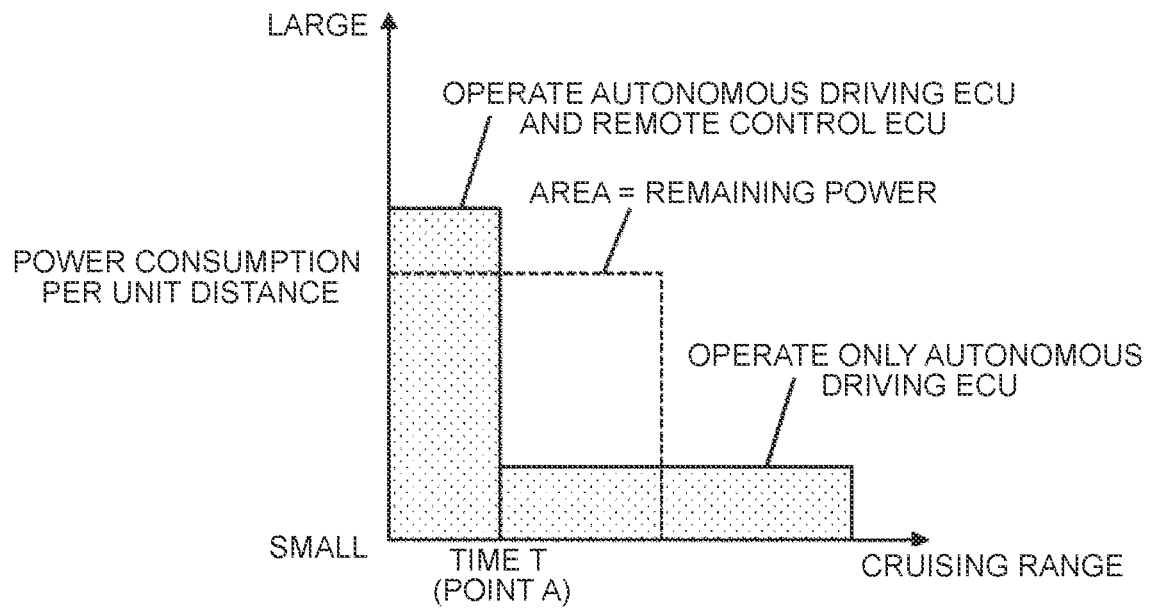
FIG. 10 is a graph showing the relationship between the number of driving function ECUs that operate simultaneously and the cruising range.

FIG. 10 is a graph showing the relationship between the number of driving function ECUs that operate simultaneously and the cruising range. The abscissa represents the cruising range (m), and the ordinate represents power consumption per unit distance (Wh/m). The area of a rectangle represents the amount of power consumed. The cruising range is short when a large number of driving function ECUs operate simultaneously. The cruising range is increased by reducing the number of driving function ECUs that operate simultaneously. In the example shown in FIG. 10, the autonomous driving ECU 211 and the remote control ECU 212 are active until time T (point A), and only the autonomous driving ECU 211 is operated after time T. The vehicle 20 thus continues to run so that the amount of power consumed does not become larger than the remaining power. In addition to determining the time T based on the remaining power, the time T may be determined based on whether there is any passenger in the vehicle 20. For example, when there is any passenger in the vehicle 20, smooth driving is implemented by making more than one driving function ECU active. When there is no passenger in the vehicle 20, power consumption is minimized by making the minimum number of driving function ECUs active.

6. Other Embodiments

In the above embodiment, the operating states of the driving function ECUs are individually changed so that the vehicle 20 can reach the destination along a set route. However, when the highest priority is given to making the vehicle 20 reach the destination, it is considered that a change to the route to the destination can be allowed if the total amount of power consumed can be reduced.

Figure 11:
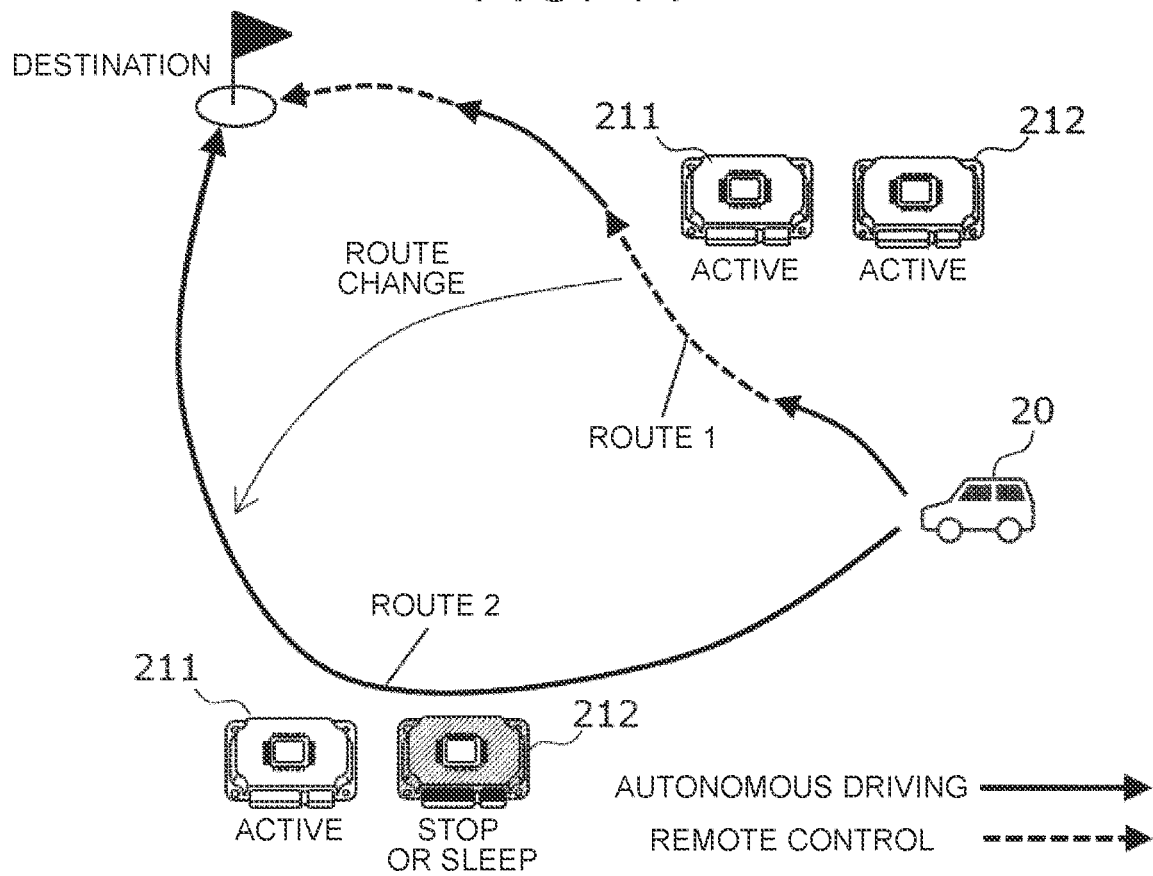
FIG. 11 shows a specific example of a route change according to a change of the operating states when the driving function ECUs are the autonomous driving ECU and the remote control ECU.

For example, in an example shown in FIG. 11, an initially set route 1 is a route with the shortest distance to the destination. However, when the vehicle 20 travels along the route 1, the vehicle 20 cannot reach the destination by autonomous driving alone, and remote control is needed on the way to the destination. It is therefore necessary to make the autonomous driving ECU 211 and the remote control ECU 212 active for the route 1. On the other hand, a route 2 has a longer distance to the destination than the route 1, but the vehicle 20 can reach the destination by autonomous driving alone. Therefore, only the autonomous driving ECU 211 is made active and the remote control ECU 212 can be stopped or put to sleep for the route 2. The power consumption amount consumed until the vehicle 20 reaches the destination depends on the number of driving function ECUs that are active and the travel distance. When the power consumption amount is smaller for the route 2 than for the route 1 and the power consumption amount can be reduced to the remaining power or less by selecting the route 2, the remote control ECU 212 is stopped or put to sleep, and the route is changed from route 1 to the route 2.

Figure 12:
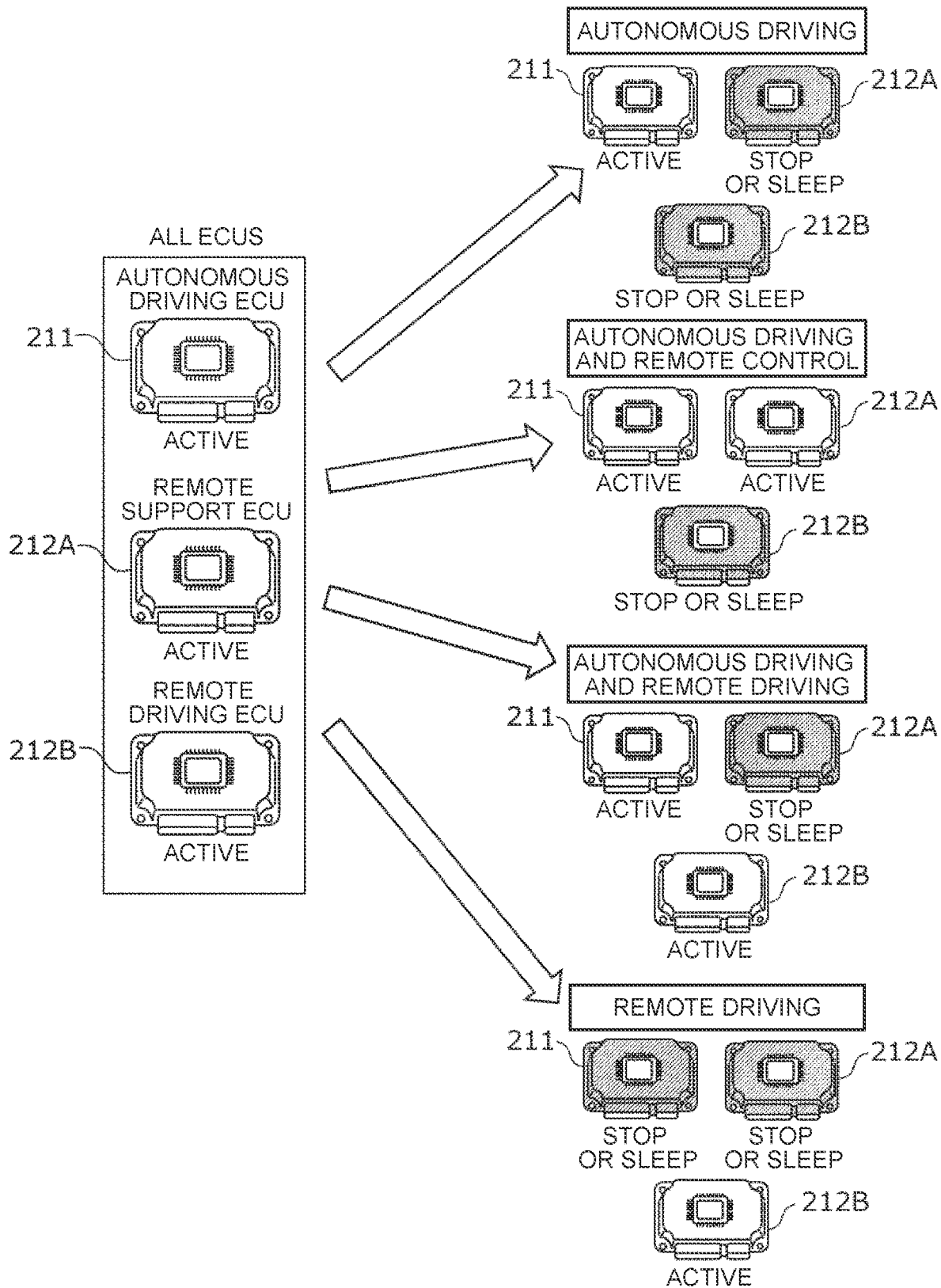
FIG. 12 shows specific examples of a change of the operating states when the driving function ECUs are the autonomous driving ECU, a remote support ECU, and a remote driving ECU.

For example, as shown in FIG. 12, the remote control ECU 212 in the above embodiment may be separated into a remote support ECU 212A for remote support and a remote driving ECU 212B for remote driving. In this case, since the remote support is performed to assist in autonomous driving, the autonomous driving ECU 211 need also be active when the remote support ECU 212A is active. On the other hand, the operating state of the remote driving ECU 212B can be changed regardless of the operating states of the autonomous driving ECU 211 and the remote support ECU 212A.

FIG. 12 shows four specific examples of changing the operating states when all of the autonomous driving ECU 211, the remote support ECU 212A, and the remote driving ECU 212B are active and it is determined that the vehicle 20 cannot reach the destination with the autonomous driving ECU 211, the remote support ECU 212A, and the remote driving ECU 212B kept in their current operating states. The four examples shown in FIG. 12 will be sequentially described from top to bottom. In the first specific example, the autonomous driving ECU 211 is kept active, and the remote support ECU 212A and the remote driving ECU 212B are stopped or put to sleep. In this case, only the autonomous driving function can be used.

In the second specific example, the autonomous driving ECU 211 and the remote support ECU 212A are kept active, and the remote driving ECU 212B is stopped or put to sleep. In this case, the autonomous driving function and the remote support function can be used as the driving functions after this change.

In the third specific example, the autonomous driving ECU 211 and the remote driving ECU 212B are kept active, and the remote support ECU 212A is stopped or put to sleep. In this case, the autonomous driving function and the remote driving function can be used as the driving functions after this change.

In the fourth specific example, the remote driving ECU 212B is kept active, and the autonomous driving ECU 211 and the remote support ECU 212A are stopped or put to sleep. In this case, only the remote driving function can be used as the driving function after this change.

As shown in the above specific examples, there is a plurality of options to choose from when changing the operating states of the three driving function ECUs that are currently in operation. FIG. 13 illustrates an example of a method for selecting which driving function ECU to operate and which driving function ECU to stop or put to sleep. In the example shown in FIG. 13, the individual power consumption amounts of the autonomous driving ECU 211, the remote support ECU 212A, and the remote driving ECU 212B are calculated. A combination of driving function ECUs whose overall power consumption amount is not larger than the remaining power is selected. In the example shown in FIG. 13, the autonomous driving ECU 211 and the remote support ECU 212A are kept active, and the remote driving ECU 212B is stopped or put to sleep. In this example, it is also possible to keep only the autonomous driving ECU 211 active. However, in some embodiments, from the standpoint of service to passengers, the remote support ECU 212A is kept active so that remote support can be provided at any time.

The operation mode of the autonomous driving ECU 211 can be switched between the long-time prediction mode and the short-time prediction mode. The operation mode of each of the remote support ECU 212A and the remote driving ECU 212B can be switched between the high-speed communication mode and the low-speed communication mode. Changing the operation mode may be used as a method for shifting a part of the driving function ECUs that are in operation out of all the driving function ECUs to the power saving state.

What is claimed is:
1. An autonomous driving device comprising:
   a plurality of driving function electronic control units having a function to drive a vehicle in place of an occupant; and
   a driving function switch electronic control unit is configured to individually change operating states of the driving function electronic control units according to a route to a destination and remaining power,
   wherein the driving function electronic control units include:
      an autonomous driving electronic control unit configured to autonomously drive the vehicle, and
      a remote control electronic control unit configured to operate the vehicle according to remote control from outside,
   wherein the driving function switch electronic control unit is configured to shift a part of the driving function electronic control units that are in operation out of the plurality of driving function electronic control units to a power saving state when the vehicle is not going to reach the destination with the remaining power,
   wherein the autonomous driving electronic control unit has a long-time prediction mode in which the autonomous driving electronic control unit predicts a distant future, and a short-time prediction mode in which the autonomous driving electronic control unit predicts a near future, and
   wherein the autonomous driving electronic control unit is configured to:
      operate in the long-time prediction mode, and
      operate in the short-time prediction mode in the power saving state.
2. The autonomous driving device according to claim 1, wherein the driving function switch electronic control unit is configured to preferentially shift the remote control electronic control unit to the power saving state when the autonomous driving electronic control unit and the remote control electronic control unit are active operating states.
3. The autonomous driving device according to claim 1, wherein the driving function electronic control units are configured to stop or sleep in the power saving state.
4. The autonomous driving device according to claim 1, wherein:
   the remote control electronic control unit has a high-speed communication mode in which the remote control electronic control unit communicates with the outside at a high communication speed, and a low-speed communication mode in which the remote control electronic control unit communicates with the outside at a low communication speed; and
   the remote control electronic control unit is configured to:
      operate in the high-speed communication mode, and
      operate in the low-speed communication mode in the power saving state.
5. The autonomous driving device according to claim 1, wherein the driving function switch electronic control unit is configured to select a combination of the route and the operating states of the driving function electronic control units that enables the vehicle to reach the destination from the operating states of the driving function electronic control units when the route is changed and the vehicle is not going to reach the destination with the remaining power.
6. An autonomous driving method for autonomously driving a vehicle by a plurality of driving function electronic control units having a function to drive the vehicle in place of an occupant, the driving function electronic control units including an autonomous driving electronic control unit configured to autonomously drive the vehicle, and a remote control electronic control unit configured to operate the vehicle according to remote control from outside, the autonomous driving method comprising:

acquiring a route to remaining power and a destination;

individually changing operating states of the driving function electronic control units according to the route and the remaining power; and shifting a part of the driving function electronic control units that are in operation out of the plurality of driving function electronic control units to a power saving state when the vehicle is not going to reach the destination with the remaining power, wherein the autonomous driving electronic control unit has a long-time prediction mode in which the autonomous driving electronic control unit predicts a distant future, and a short-time prediction mode in which the autonomous driving electronic control unit predicts a near future; and the autonomous driving electronic control unit is configured to:

operate in the long-time prediction mode, and operate in the short-time prediction mode in the power saving state.

7. A non-transitory storage medium storing instructions that are executable by a driving function switch electronic control unit and that cause the driving function switch electronic control unit to perform functions comprising:

switching operating states of a plurality of driving function electronic control units according to remaining power and a route to a destination, wherein the driving function electronic control units have a function to drive a vehicle in place of an occupant;

wherein the driving function electronic control units include:

an autonomous driving electronic control unit configured to autonomously drive the vehicle, and a remote control electronic control unit configured to operate the vehicle according to remote control from outside;

wherein the driving function switch electronic control unit is configured to shift a part of the driving function electronic control units that are in operation out of the plurality of driving function electronic control units to a power saving state when the vehicle is not going to reach the destination with the remaining power;

wherein the autonomous driving electronic control unit has a long-time prediction mode in which the autonomous driving electronic control unit predicts a distant future, and a short-time prediction mode in which the autonomous driving electronic control unit predicts a near future; and wherein the autonomous driving electronic control unit is configured to:

operate in the long-time prediction mode, and operate in the short-time prediction mode in the power saving state.

* * * * *